(12) United States Patent
Skillermark et al.

(10) Patent No.: US 8,134,932 B2
(45) Date of Patent: Mar. 13, 2012

(54) METHOD AND ARRANGEMENT IN A TELECOMMUNICATION SYSTEM

(75) Inventors: Per Skillermark, Stockholm (SE); Lei Wan, Beijing (CN); Jingyi Liao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 501 days.

(21) Appl. No.: 12/293,727

(22) PCT Filed: Mar. 20, 2007

(86) PCT No.: PCT/SE2007/050172
§ 371 (c)(1),
(2), (4) Date: Sep. 19, 2008

(87) PCT Pub. No.: WO2007/111563
PCT Pub. Date: Oct. 4, 2007

(65) Prior Publication Data
US 2010/0220608 A1    Sep. 2, 2010

(30) Foreign Application Priority Data
Mar. 24, 2006 (SE) ...................................... 0600690

(51) Int. Cl.
*H04J 3/17* (2006.01)
(52) U.S. Cl. .......................... 370/252; 370/434; 370/464
(58) Field of Classification Search .......... 370/229–232, 370/252, 400, 401
See application file for complete search history.

(56) References Cited

U.S. PATENT DOCUMENTS

| | | | |
|---|---|---|---|
| 6,977,888 B1 * | 12/2005 | Frenger et al. ................ | 370/236 |
| 7,406,337 B2 * | 7/2008 | Kim et al. ..................... | 370/252 |
| 7,499,474 B2 * | 3/2009 | Derryberry et al. .......... | 370/538 |
| 2003/0174669 A1 * | 9/2003 | Roh et al. ...................... | 370/328 |
| 2007/0201437 A1 * | 8/2007 | Kim et al. ..................... | 370/352 |
| 2008/0123542 A1 * | 5/2008 | Karlsson ....................... | 370/252 |
| 2009/0185533 A1 * | 7/2009 | Kim et al. ..................... | 370/329 |

FOREIGN PATENT DOCUMENTS

| | | |
|---|---|---|
| EP | 1821440 A1 | 8/2007 |
| GB | 2 411 556 A | 8/2005 |
| WO | WO 2005/032154 | 4/2005 |

OTHER PUBLICATIONS

Waldschmidt, C., et al. "Quality measures and examples of arrays for MIMO in hand-held devices" Antennas and Propagation Society International Symposium, 2004 IEEE, vol. 2, Jun. 20-25, 2004.

(Continued)

*Primary Examiner* — Aung S Moe
*Assistant Examiner* — Kerri Rose

(57) ABSTRACT

The present invention relates to methods and arrangements in a multi-antenna radio communication system, in particular to methods and arrangements for improved multiple HARQ transmission in such systems. While HARQ transmission schemes, as known in the art, only can consider the fact whether or not a transmission attempt has been successful the present invention provides a HARQ retransmission scheme that considers the reception quality for already performed transmissions of a same data packet when selecting a resource allocation for necessary re-transmissions. Resource allocation for retransmissions is based on a pre-defined metric indicating a quality of the reception of the previous transmission attempts. Such a metric can be derived from a quality measure derived in the receiver unit, e.g. a CQI or CSI-based value, or an appropriate measure of the mutual information, e.g. the accumulated conditional mutual information (ACMI).

2 Claims, 2 Drawing Sheets

OTHER PUBLICATIONS

Wang, Hai, et al.; "HSDPA link adaptation based on novel quality model", Vehicular Technology Conference, 2005. VTC 2005-Spring. 2005 IEEE 61$^{st}$, vol. 1, May 30-Jun. 1, 2005.

Wan, L. et al. A Fading-Insensitive Performance Metric for a Unified Link Quality Model. Wireless Communications and Networking Conference, 2006. WCNC 2006. IEEE, vol. 4, No., pp. 2110-2114, Apr. 3-6, 2006.

* cited by examiner

METHOD AND ARRANGEMENT IN A TELECOMMUNICATION SYSTEM

FIELD OF THE INVENTION

The present invention relates to methods and arrangements in a multi-antenna radio communication system, in particular to methods and arrangements for improved multiple HARQ transmission in such systems.

BACKGROUND OF THE INVENTION

Much research has been performed during the last years on using multiple transmit and receive antennas (MIMO) for delivering high data rates over wireless channels. Different multi-antenna methods exploit the different properties of radio channels in order to leverage one or more of the array-, diversity-, and spatial-multiplexing gains. Spatial multiplexing, for instance, may increase the peak data rates and the spectral efficiency of a multi-antenna system. Several well-known transmitter and receiver architectures have been proposed to extract the promised multiplexing gains. One example is the Vertical Bell Labs Space Time Architecture (V-BLAST). Furthermore, a horizontal MIMO structure in which each one of the encoded streams are modulated and transmitted over different transmit antennas, known as Per Antenna Rate Control (PARC), attracts more and more attentions due to good performance. In PARC, the coding rate and the modulation of the stream transmitted from each antenna is controlled based on channel quality information that is, e.g., sent to the transmitter by the receiver. Depending on channel conditions, the transmitter might decide to use a subset of the transmit antennas only. This scheme is known as Selective Per-Antenna Rate Control (S-PARC).

Hybrid ARQ (HARQ) is a way to achieve reliable data delivery in a data communication system. HARQ allows combining features of a pure Forward Error Control (FEC) scheme and a pure Automatic Repeat reQuest (ARQ) scheme. Error correction and error detection functions are performed along with ACK/NACK feedback signaling. HARQ techniques have been adopted by several wireless standardization bodies, for example 3GPP and 3GPP2. HARQ can improve throughput performance, compensate for link adaptation errors, and provide a finer granularity in the rates effectively pushed through the channel. Upon detecting a transmission failure, e.g. by cyclic redundancy check (CRC), the receiver sends a request to the transmitter for retransmission.

Several efforts have focused on HARQ transmission in MIMO systems, e.g. for so called MIMO multiple ARQ (MMRQ) providing an efficient combination of MIMO and HARQ structure that yields more than 30% gain in link throughput in a MIMO system using per-antenna encoders (more specifically to have one ARQ process per stream) as described, e.g., in the document "Multiple ARQ processes for MIMO systems" by H. Zheng, A. Lozano, M. Haleem published in EURASIP Journal on Applied Signal Processing, 2004.05, p. 772-782.

HARQ transmission schemes in MIMO systems include, e.g., MIMO single ARQ (MSARQ) and MIMO multiple ARQ (MMARQ). With MSARQ, HARQ simply attaches a single CRC to the radio packet with a CRC encompassing the data radiated from the various transmit antennas. With MMARQ, multiple ARQ processes are employed in the MIMO channel, i.e. a CRC symbol is appended to each sub-stream. These MIMO-HARQ schemes, however, provide an indiscriminate service for all type of radio packets, i.e. they do not consider the characteristic of the radio packets. This is disadvantageous as usually different types of radio packets can have different priorities to transmit on the shared transmission channel. In addition, the first transmission and each retransmission attempt in HARQ might experience different channel qualities. To reach a good diversity gain in HARQ, either IR or CC, the transmission decision should be optimized or adaptive to the instant channel quality. Here the transmission decision includes both the antenna selection and the stream-wise selection for each transmission attempt.

SUMMARY OF THE INVENTION

It has thus been observed to be a problem that HARQ transmission schemes, as known in the art, only can consider the fact whether or not a transmission attempt has been successful.

It is therefore an object of the present invention to provide methods and arrangements for an improved HARQ retransmission scheme, in particular for MIMO systems.

Basically, it is the main idea of the present invention to provide a HARQ retransmission scheme that considers the reception quality for already performed transmissions of a data packet when selecting a resource allocation for necessary re-transmissions. Resource allocation for retransmissions is based on a pre-defined metric indicating a quality of the reception of the previous transmission attempts in form of a probability measure for a successful decoding of said data packet. Such a metric can be derived from a quality measure derived in the receiver unit, e.g. a CQI or CSI-based value, or an appropriate measure of the mutual information, e.g. the accumulated conditional mutual information (ACMI). A further criterion can be the priority of the data packet to be sent.

It is an advantage of the present invention to provide an antenna stream selection scheme that improves multiple HARQ transmission in MIMO systems achieving improvements by introducing antenna selection based on a criterion, e.g. priority classes or ACMI, that is compatible with existing multi-stream HARQ transmission for MIMO systems and available for different access systems, e.g. OFDM-, TDMA-, or CDMA-based systems.

DESCRIPTION OF THE INVENTION

Figure 1:
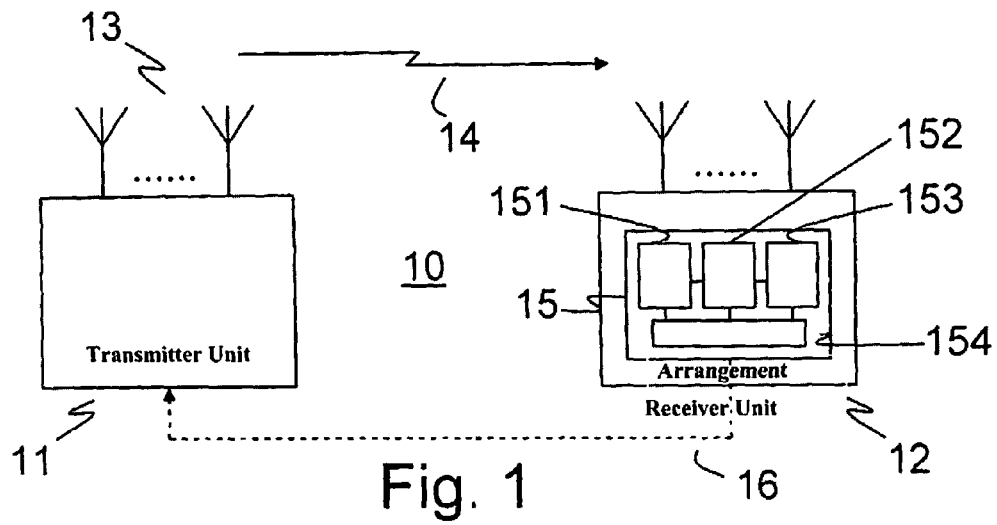
FIG. 1 illustrates a transmitter unit and a receiver unit wherein the present invention is located.

The present invention refers to supporting of an antenna (or stream) selection mechanism, in particular suitable for a multi-antenna system, i.e. providing at least multiple antennas 13 at the site of the transmitter unit 11 adapted for multi-stream transmissions 14, in which the resource allocation (in terms of frequency-, time-, or code-resources) and the antenna selection order at the site of a transmitter unit 11 for re-transmission of data packets is based on a quality metric derived from received data packets at the site of the receiver unit 12 and, possibly, on further criterions (e.g. a priority) indicating the significance of the received data packets. The metric is to provide an information measure that indicates with what probability it is possible to decode a certain data packet that has been already received once or, possibly, after one or several retransmissions. An arrangement 15 located in or attached to the receiver unit 12 is adapted to derive said metric and provide a feedback information element 16 to the transmitter unit 11. From this information the transmitter unit 11 can conclude the necessary resource need, depending on the applied transmission technique, for an additional retransmission for which it is predicted that the receiver unit 12 can successfully decode the data packet.

The present invention is further about the necessary signaling of feedback information from the receiver unit to the transmitter unit and, in case of a possible reordering of streams for the retransmission, also from the transmitter unit to the receiver unit. The receiver unit 12 and, correspondingly, the transmitter unit 11 can within the scope of the present invention be regarded to be part of a fixed base station or a mobile user equipment. The present invention is applicable for various transmission techniques, e.g. OFDM-, TDMA-, and CDMA-based communication systems.

There are various possibilities of defining an appropriate metric as described above that can be used to provide an improved feedback information measure to a transmission unit for HARQ-retransmissions. Hereby, an appropriate information measure contains information that allows a conclusion on the actually received content from, e.g., the transmission channel properties or receiver capabilities. Examples of possible metrics include thus, e.g., channel quality information (CQI), channel state information (CSI), or a mutual information measure like the ACMI. The CQI for instance can provide a measure of the signal to interference ratio measured for a data stream or part of such stream consisting of a plurality of symbols whereby the SNR can refer to each symbol or a number of symbols. The ACMI denotes the mutual information from several attempts of soft combining. For example, the ACMI for a chase combining (CC) scheme for a packet flow after a number F of transmission attempts may be estimated by $$ACMI_F = C\left(\sum_{f=1}^{F} SNR_{Af}^{f}\right).$$

When applying an incremental redundancy (IR) soft combining scheme the ACMI for a packet flow after a number F of transmission attempts may be estimated by $$ACMI_F = \sum_{f=1}^{F} C(SNR_{Af}^{f}).$$

$SNR_{Af}^{f}$ denotes the signal-to-noise ratio through a selected antenna Af for the $f^{th}$-transmission and C(SNR) denotes a mapping function of SNR to information or throughput. Such functions can for instance be stored in form of tables. Examples for a mapping can be found, e.g., in the document "A fading-insensitive performance metric for a unified link quality model" by Lei Wan, Shiauhe Tsai, Magnus Almgren, published in IEEE Wireless Communications and Network Conference (WCNC) 2006, Las Vegas, USA, 2006.

When assuming a data packet for which the transmitter unit already has performed F transmission attempts and where an extra retransmission is required, the antenna (or stream) Aj is selected that results in an estimated value for the mutual information measure $ACMI_{F+1}$ that provides the closest approximation to an estimated mutual information threshold indicated by a desired or required probability to successfully decode the data packet. For a chase combining scheme the $ACMI_{F+1}$ may be estimated by $$ACMI_{F+1} = C\left(\sum_{f=1}^{F} SNR_{Af}^{f} + SNR_{Aj}^{F+1}\right)$$

and for incremental redundancy by $$ACMI_{F+1} = \sum_{f=1}^{F} C(SNR_{Af}^{f}) + C(SNR_{Aj}^{F+1}),$$

where $SNR_{Aj}^{F+1}$ is the forecasted SNR for the next retransmission of the packet flow by antenna Aj. The threshold could be defined, e.g., as a maximum mutual information threshold that is required for its decoding.

Figure 4:
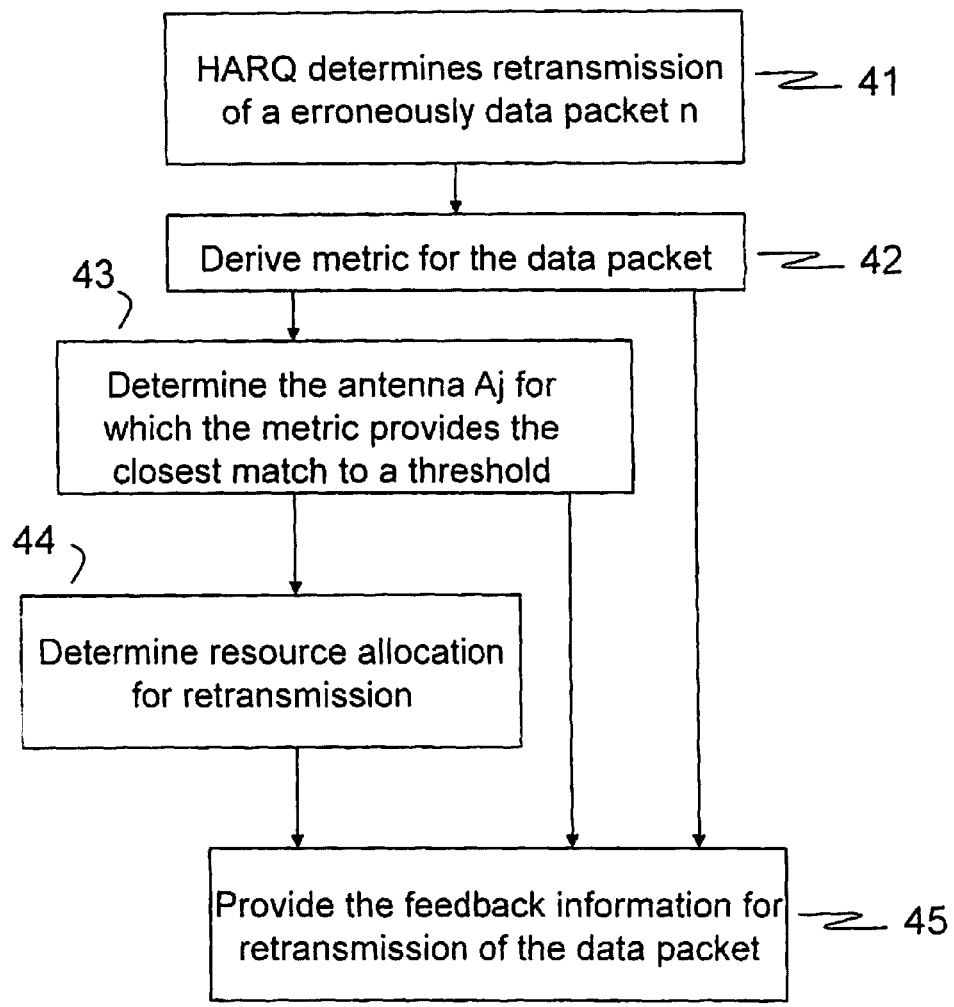
FIG. 4 illustrates a flowchart of the present invention.

FIG. 4 shows a flowchart illustrating the method according to the present invention. The method starts after an indication 41 of the HARQ-algorithm that a received data packet needs to be retransmitted, which will be necessary if this data packet has been received in such a way that it is not possible to decode it. While the HARQ-algorithm according to the state of the art only indicates that a data packet needs to be re-sent, the method according to the present invention now specifies more details how a data packet should be retransmitted. These details indicate inter alia necessary transmission resources and priorities. The next step determines 42 a quality metric for the data packet. This can be done by applying one or more of, e.g., the metrics defined above. The derived metric should in any case indicate how well, or to which degree, a data packet has already been received. This indication is then provided 45 as a feedback information to the transmitter unit that is responsible for the retransmission of the data packet. Here there are several conceivable alternatives: According to a first alternative, the method provides 45 the metric for determining the necessary resource allocation in the transmitter unit or, according to a second alternative, the method already derives 43 an estimate of the metric if a certain one of the transmission antennas $A_j$ is used for the retransmission. Finally, it is also possible that the method provides 44 an indication of a suggested resource allocation in response to the derived metric. Instead of providing the calculated metric it is also possible to provide the parameters that are necessary to calculate the metric.

The final decision about resource allocation, antenna (stream) selection and prioritization is normally made in the transmitter unit. Thus, the present invention also implies the step that a transmitter unit informs the receiver unit in case of retransmissions with a changed antenna configuration compared to the original or previous transmission and the receiver unit is capable to detect and apply such information.

Figure 2:
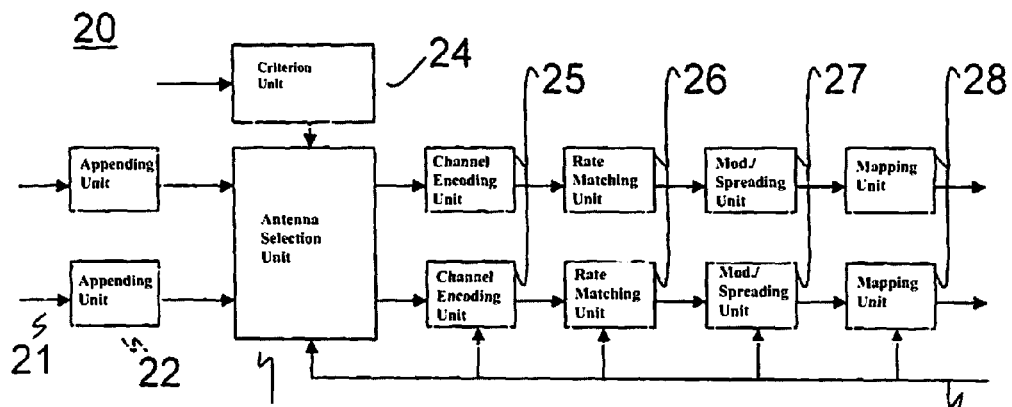
FIG. 2 illustrates an antenna (stream) selection structure for multiple HARQ transmission at the transmitter site.
Figure 3:
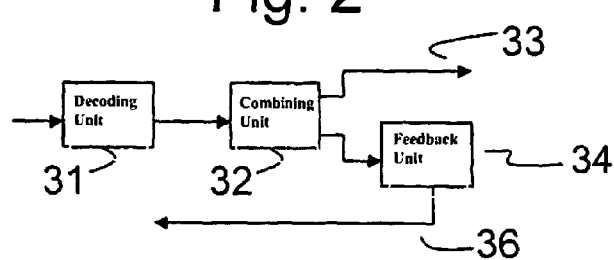
FIG. 3 illustrates a structure for receiving streams at the receiver site.

FIG. 2 shows a part of a transmitter unit 20 including a selection structure for multiple HARQ transmissions in a MIMO-system. Multiple HARQ flows on a space- or stream-level can be provided by PARC or S-PARC schemes for MIMO systems. At the transmitter, by applying a per-antenna encoding and appending 22 a CRC-field to each flow, it becomes possible that several separate HARQ processes can be provided and transmitted through different antennas or streams. Antenna or stream selection 23 is used to map different (re)transmissions to different antennas (streams) based on a selection criterion 24,29. In said figure, data packets for transmission are considered in form of a flow of segmented Layer 2 packet data units (PDUs) with attached checksum (CRC). The antenna selection unit 23 determines the antenna (stream) combination to be used for sending said data packets. This determination can be based on several criterions provided by a unit 24 including information about the data packets to be sent, e.g. the traffic type or a priority indication, but also, in particular for retransmissions, based on a feedback information 29 regarding the reception quality of a previous transmission, e.g. by means of the metric according to the present invention which has been calculated from the ACMI, the CQI or CSI or any other feedback measure. From this information the antenna selection unit 23 decides by which antenna(s) or stream(s) a flow is transmitted. The stream is then forwarded to a channel encoding unit 25 (with or without interleaver), a rate matching unit 26 (e.g. performed by puncturing or repetition), and a data modulation and spreading unit 27. Finally, a unit 28 is intended to map each stream to one or several resource blocks and antennas. In case of an OFDM system, "resource block" denotes the sub-carrier resource blocks while, for CDMA systems, "resource block" denotes a code resource or for a TDMA system a time slot.

At the receiver 30, a first unit 31 is intended to decode each sub-stream whereby the associated CRC can be used to validate the content. In case of interference cancellation and HARQ packet combining procedures the receiver can decode a sub-stream and use its associated CRC to validate the content. If this sub-stream carries a retransmission packet but contains one or more uncorrectable errors, a combining unit 32 can combine the soft symbols of the packet with those of previous transmission(s) to extract the information data. The receiver then performs interference cancellation to remove the interference due to this sub-stream. The received data packet can then be forwarded 33 for further processing by higher layer units. In case an additional retransmission is necessary, a unit 34 can derive the appropriate feedback information according to the present invention as described above in conjunction with FIG. 4 and provide this information back to the transmitter unit.

The present invention implies the need for an appropriate signaling with regard to the retransmission feedback information on the one hand and, as forward transmission, in order to support the antenna selection mechanism. As already indicated above, the present invention allows for several alternatives for providing retransmission feedback information, either by providing those parameters that are necessary to derive the metric or by providing the derived metric itself. Also, it might be conceivable to provide an indication of a recommended resource allocation for the retransmission.

At the transmitter site, signaling of the transmitter unit in conjunction with the present invention shall assure that a receiver knows which packets are transmitted through which streams even for packet retransmissions. Channel quality information (e.g. CQI, CSI, or ACMI) is required to report the quality of each of the possible transmitted streams. The ACMI estimation can be set in the transmitter or receiver. If set in the transmitter, the receiver informs the transmitter on the CQI-values of the possible used streams to facilitate antenna selection in the transmitter. If the ACMI estimation is set in the receiver, it is the receiver that decides which transmission that is carried by which stream and then to inform the transmitter to adjust its usage of streams. This signaling could be done, e.g., together with ACK/NACK signaling. Multiple acknowledgment (NACK/ACK) indications are required to be sent back to the transmitter. After receiving these acknowledgements, the transmitter sends fresh packets from the transmit antennas that have been successfully acknowledged and retransmits the sub-streams that have been negatively acknowledged through their associated transmit antennas. Hence, the HARQ operations at different transmit antennas are independent of each other.

If the ACMI estimation is set in the transmitter, the CQI or CSI is required to report for each of the possible transmitted streams. When assuming that there are M streams under consideration there is an M-fold increase in CQI, CSI, or ACMI information that is required to be reported.

Optionally, a priority indication can be applied as one additional criterion for antenna (or stream-wise) selection. This can imply that, for instance, high priority packets will be given a priority to select the antenna or stream that should be used for transmission. For example, retransmission may have higher priority than the $1^{st}$ transmission, and the last IP segment radio packet may have higher priority than other types of segment radio packet. The ACMI or any other quality feedback metric can be used for antenna selection among radio packets with the same priority.

The invention claimed is:

1. A method in an arrangement integrated in or attached to a receiver unit in a wireless multi-antenna communication system said receiver unit equipped to receive data streams sent from one or more transmitter antennas for transmission of data packets from a transmitting unit comprising:
   receiving an indication from a HARQ-process in case a data packet has been erroneously received;
   deriving a metric indicating a measure of the received information content of said data packet from its first transmission and subsequent retransmissions;
   providing to the transmitting unit a feedback information element based on said metric such that the transmitting unit can determine its resource need for the re-transmission of said data packet;
   whereby the calculation of said metric includes a measure of the characteristics of the channel on which the previous transmissions of said data packet have been received;
   whereby said characteristics include the link capacity of the channel; and
   whereby the link capacity is calculated as a normalized value that is independent of one or more of the applied coding, modulation, and packet size.

2. An arrangement integrated in or attached to a receiver unit in a wireless multi-antenna communication system said receiver unit equipped to receive data streams sent from one or more transmitter antennas for transmission of data packets from a transmitting unit wherein:
   a receiver for receiving an indication from a HARQ-process in case a data packet has been erroneously received;
   a calculator for deriving a metric indicating a measure of the received information content of said data packet from its first transmission and subsequent retransmissions;
   an assembler for assembling and providing a feedback information element based on said metric such that the transmitting unit can determine its resource need for the re-transmission of said data packet;
   whereby the calculation of said metric includes a measure of the characteristics of the channel on which the previous transmissions of said data packet have been received;
   whereby said characteristics include the link capacity of the channel; and
   whereby the link capacity is calculated as a normalized value that is independent of one or more of the applied coding, modulation, and packet size.

* * * * *